(No Model.)  2 Sheets—Sheet 1.

J. M. DOAN & J. G. SICKLES.
TRICYCLE.

No. 538,482. Patented Apr. 30, 1895.

Witnesses
A. L. Habby
L. J. Whittemore

Inventors
John M. Doan
John G. Sickles
By Thos. S. Sprague & Son
Attys.

(No Model.) 2 Sheets—Sheet 2.

J. M. DOAN & J. G. SICKLES.
TRICYCLE.

No. 538,482. Patented Apr. 30, 1895.

Witnesses
A. L. Mobby
L. J. Whittemore

Inventors
John M. Doan
John G. Sickles
By M. L. Sprague Son
Attys

THE NORRIS PETERS CO., PHOTO-LITHO., WASHINGTON, D. C.

UNITED STATES PATENT OFFICE.

JOHN M. DOAN AND JOHN G. SICKLES, OF VANDALIA, MICHIGAN.

TRICYCLE.

SPECIFICATION forming part of Letters Patent No. 538,482, dated April 30, 1895.

Application filed May 21, 1894. Serial No. 511,929. (No model.)

*To all whom it may concern:*

Be it known that we, JOHN M. DOAN and JOHN G. SICKLES, citizens of the United States, residing at Vandalia, in the county of Cass and State of Michigan, have invented certain new and useful Improvements in Tricycles, of which the following is a specification, reference being had therein to the accompanying drawings.

The invention consists in the peculiar construction of the drive mechanism and the frame, and further in the peculiar construction, arrangement and combination of the various parts.

Figure 1:
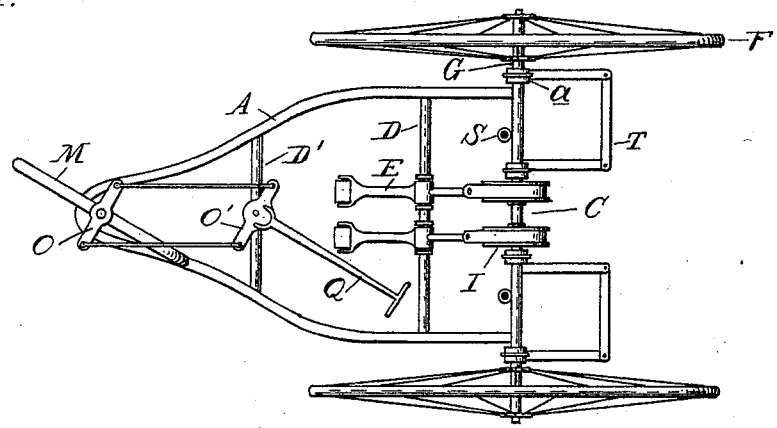
Figure 2:
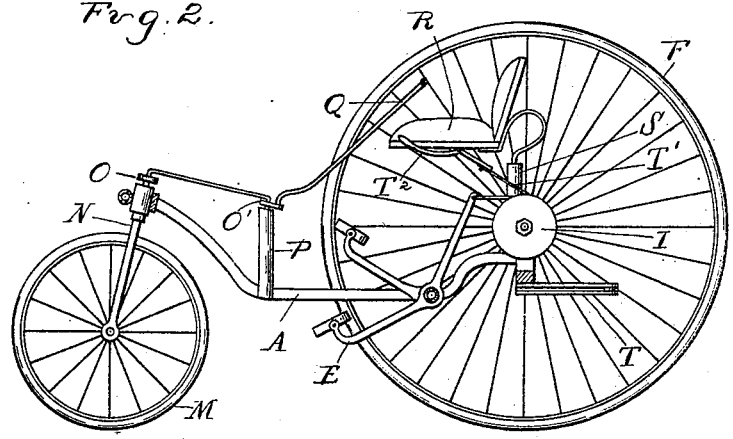
Figure 5:
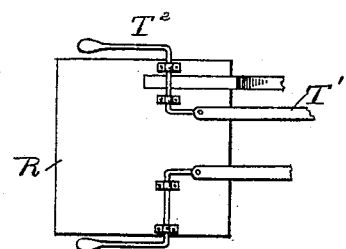
Figure 3:
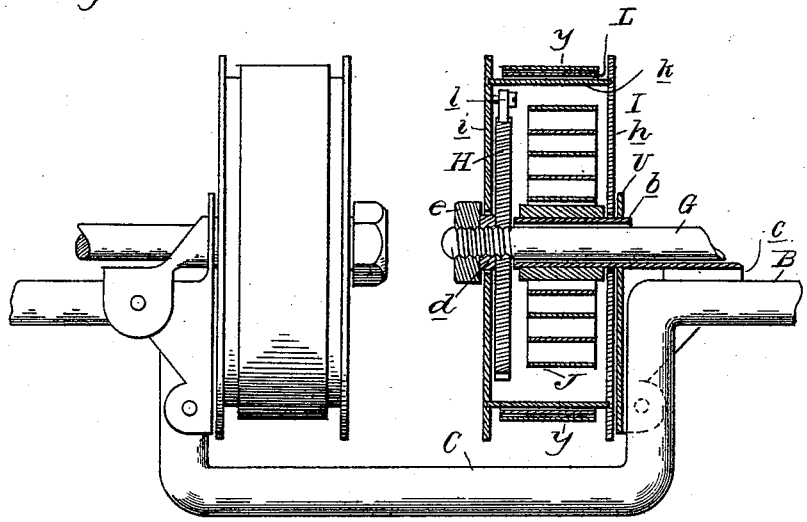
Figure 4:
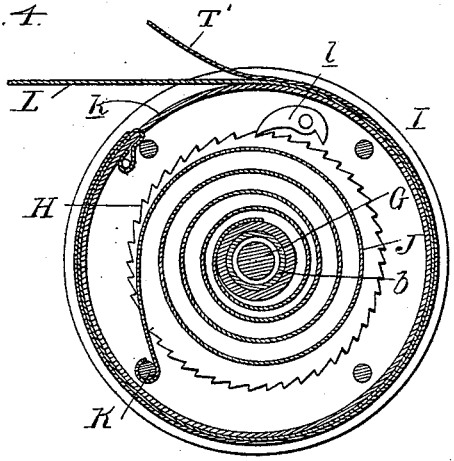
Figure 7:
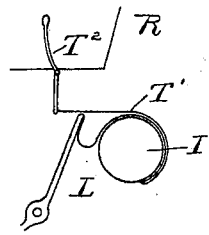
Figure 6:
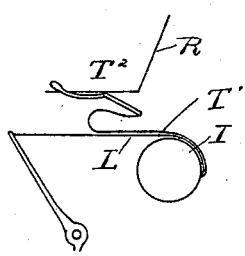

In the drawings, Figure 1 is a top plan view of a tricycle embodying our invention. Fig. 2 is a vertical central longitudinal section. Fig. 3 is a cross-section through the rear of the frame, illustrating the construction of the ratchet-and-pawl device for driving the stub-axles. Fig. 4 is a cross-section on line $y$ $y$, Fig. 3. Fig. 5 is a bottom plan of the seat. Figs. 6 and 7 are diagrams showing the operation of the foot and hand propelling mechanism, respectively.

A is a supporting frame of any desired construction, preferably consisting of inclined side bars connected together at the front and at the rear connected by the cross bar or axle bar B which has the central depressed or drop section C. In front of this axle bar are cross-bars D D' for stiffening the frame. The bar D serves as the fulcrum for the bell crank levers E which serve as pedal levers for propelling the machine.

F are wheels which are secured upon stub axles G. These stub axles extend inward from either side and are journaled in boxes $a$ at the outer end of the axle bar B and in the sleeves $b$ near their inner ends. These stub axles project from either side over the drop section C of the axle bar. The sleeves $b$ are supported at the bend in the axle bar by means of the stirrups or lugs $c$, the stub axles projecting beyond the end of the sleeves and on this projecting portion are secured the ratchet wheels H, by means of the nuts $d$ $e$.

I is a hollow cylindrical drum formed of two disks $h$ $i$ connected by a cylindrical casing $k$. This drum is journaled on the sleeve $b$. The disk $i$ of the drum carries the gravity dog or pawl $l$ adapted to engage in its upper position with the teeth of the ratchet wheel H.

J is a spiral spring having its inner end secured to the sleeve $b$ and at its outer end to the pin K, which connects the two disks of the drum. The drum is connected with one arm of the bell crank lever by means of the strap L.

In front of the machine is the guide wheel M, supported in the front fork N which is pivoted in the frame of the machine.

O is a cross-head or lever on the top of the fork, connected with the steering lever O' journaled in the standard P on the frame, and Q is a hand lever connected to the lever O' for operating the steering wheel.

R is a suitable seat supported in standards S secured to the front of the axle bar B.

T are folding racks secured to the rear of the axle bar B and adapted for luggage carriers.

The parts being thus constructed their operation is as follows: The operator occupying the seat R places his feet upon the pedals formed on the forward ends of the bell crank levers, and depressing the same alternately will through the connecting strap L, rotate the drums I forward. In such forward rotation the dog $l$ will engage with the ratchet wheel H and impart motion to the stub shaft G and the wheels secured thereto. As soon as the operator releases the pressure from that pedal, the spring J will return the drum to its initial position. The sleeve $b$ is supported by the bracket U, which is secured to the drop section C of the axle bar. This bracket also serves to prevent end movement of the drum upon the stub axle or sleeve. This construction produces a tricycle capable of carrying considerable load, making good speed and one which can be cheaply constructed, is simple and not liable to get out of order.

It is often desirable to add to the foot drive mechanism, hand drive mechanism and this can easily be accomplished with our construction by applying a second strap T' upon the drums I connected to the hand levers T², having the actuating arm arranged beside the seat of the operator. When these are not in use they will not interfere with the operation of the foot lever nor will the foot lever interfere with the operation of the hand lever, as shown in Figs. 6 and 7.

What we claim as our invention is—

In a tricycle, the combination with a frame having a steering wheel in front, of the axle bar B having the drop section C centrally arranged therein, the stub axles G having wheels secured to their outer ends and projecting inwardly over the central drop section in the axle bar, bearings on the axles in which the outer ends of the stub axles are journaled, ratchets secured to the inner ends of said stub axles, sleeves secured to the axle bar and extending over the drop section and in which the inner ends of the stub axles are journaled, lugs c for securing the sleeves to the axle, drums on said sleeves inclosing the ratchets on the axles, spiral springs connected to the sleeves and to the drums, gravity dogs secured to the drums and adapted to engage with the ratchet wheels, foot levers, straps connecting the foot levers and drums, hand levers, and straps superimposed upon the connecting straps for the foot levers for connecting said drums to the hand levers, substantially as described.

In testimony whereof we affix our signatures in presence of two witnesses.

JOHN M. DOAN.
JOHN G. SICKLES.

Witnesses:
ZEBEDEE BEVERLY,
ROBERT C. SLOAN.